United States Patent
Moyer

(10) Patent No.: US 8,316,186 B2
(45) Date of Patent: *Nov. 20, 2012

(54) METHOD AND APPARATUS FOR MANAGING CACHE RELIABILITY BASED ON AN ASSOCIATED ERROR RATE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 981 days.

This patent is subject to a terminal disclaimer.

(21) Appl. No.: 12/234,619

(22) Filed: Sep. 20, 2008

(65) Prior Publication Data

US 2010/0077149 A1 Mar. 25, 2010

(51) Int. Cl.
*G06F 12/00* (2006.01)
(52) U.S. Cl. ......... 711/129; 711/123; 711/128; 711/133
(58) Field of Classification Search .................. 711/123, 711/128, 129, 144, 133; 714/6.32
See application file for complete search history.

(56) References Cited

U.S. PATENT DOCUMENTS

| | | | |
|---|---|---|---|
| 5,307,365 A | 4/1994 | Fifield | |
| 5,488,691 A | 1/1996 | Fuoco et al. | |
| 5,630,055 A | 5/1997 | Bannon et al. | |
| 5,761,715 A * | 6/1998 | Takahashi | 711/128 |
| 5,912,916 A | 6/1999 | Hendrix | |
| 5,961,660 A | 10/1999 | Capps, Jr. et al. | |
| 6,092,182 A | 7/2000 | Mahalingaiah | |
| 6,654,925 B1 | 11/2003 | Meaney et al. | |
| 6,804,799 B2 | 10/2004 | Zuraski, Jr. | |
| 7,177,986 B2 | 2/2007 | Rowlands et al. | |
| 7,254,748 B1 | 8/2007 | Wright et al. | |
| 7,321,986 B2 | 1/2008 | Ash et al. | |
| 7,603,582 B2 * | 10/2009 | Barlow et al. | 714/6.32 |
| 2002/0147722 A1 | 10/2002 | Banerjee | |
| 2006/0075193 A1* | 4/2006 | Magoshi | 711/122 |
| 2006/0282621 A1* | 12/2006 | Moyer | 711/141 |
| 2007/0044004 A1* | 2/2007 | Hino et al. | 714/763 |
| 2008/0071989 A1* | 3/2008 | McNeill, Jr. | 711/118 |
| 2008/0244181 A1* | 10/2008 | Walz et al. | 711/121 |
| 2010/0064181 A1 | 3/2010 | Moyer | |
| 2010/0077148 A1 | 3/2010 | Moyer | |

FOREIGN PATENT DOCUMENTS
EP 0418457 A2 3/1991

OTHER PUBLICATIONS

Non-Final Office Action mailed Jul. 22, 2011 for U.S. Appl. No. 12/234,618, 17 pages.
Final Office Action mailed Dec. 30, 2011 for U.S. Appl. No. 12/234,618, 18 pages.
Final Office Action mailed Jun. 8, 2012 for U.S. Appl. No. 12/234,618, 12 pages.

* cited by examiner

*Primary Examiner* — Hong Kim

(57) ABSTRACT

A method of configuring a cache includes identifying a plurality of cache configurations of a configurable cache for a processor-executable application unit. Each configuration has an associated error rate. A selected configuration is selected based at least in part on the associated error rate. The configurable cache is configured in accordance with the selected configuration for execution of the application-unit.

17 Claims, 12 Drawing Sheets

410

| WAY0 | WAY1 | WAY2 | WAY3 | ERROR |
|---|---|---|---|---|
| I | I | I | I | — |
| I | I | I | D | $0.25\varepsilon_1$ |
| I | I | D | D | $0.5\varepsilon_1$ |
| I | D | D | D | $0.75\varepsilon_1$ |
| I | I | I | D/I | $0.25\varepsilon_2$ |
| I | I | D/I | D/I | $0.5\varepsilon_2$ |
| I | D/I | D/I | D/I | $0.75\varepsilon_2$ |

410

| WAY0 | WAY1 | WAY2 | WAY3 | ERROR |
|---|---|---|---|---|
| I | I | I | I | -- |
| I | I | I | D | $0.25\varepsilon_1$ |
| I | I | D | D | $0.5\varepsilon_1$ |
| I | D | D | D | $0.75\varepsilon_1$ |
| I | I | I | D/I | $0.25\varepsilon_2$ |
| I | I | D/I | D/I | $0.5\varepsilon_2$ |
| I | D/I | D/I | D/I | $0.75\varepsilon_2$ |

412 points to the fourth data row; 414 points to $0.75\varepsilon_1$; 416 points to $0.75\varepsilon_2$.

FIG. 4

METHOD AND APPARATUS FOR MANAGING CACHE RELIABILITY BASED ON AN ASSOCIATED ERROR RATE

CROSS REFERENCE TO RELATED APPLICATIONS

This application is related to application Ser. No. (12/234,618) to William C Moyer entitled "Method and Apparatus for Managing Cache Reliability" filed on Sept. 20, 2008.

FIELD

This disclosure relates generally to data processing systems and more specifically to cache configuration.

BACKGROUND

Data processing systems utilize a cache as a temporary storage buffer between a processor and a slower external memory. A cache may variously be categorized based upon the type of information cached, the manner of searching the cache, the mapping of the cache to external memory, the physical distribution of the cache, and the hierarchical level of the cache among other attributes. A unified cache, for example, may store both data information and instruction information. Although the cache can enhance performance of the data processing system, the cache may also experience failures in time (FIT) that degrade the reliability of the system.

Error management techniques including error detection codes (EDC) and error correction codes (ECC) may be applied to improve the reliability of a cache. As the sophistication of the EDC or ECC increases, the reliability of the cache may be improved at the expense of performance of the cache. Performance and reliability can vary greatly depending upon the configuration of the cache and the attributes of the application relying upon the cache. Some applications place a higher value on performance while other applications place a higher value on reliability. This inherent conflict is problematic for cache configuration.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates a table of cache way configuration permutations and associated failure in time (FIT) error rates.

DETAILED DESCRIPTION

Figure 1:
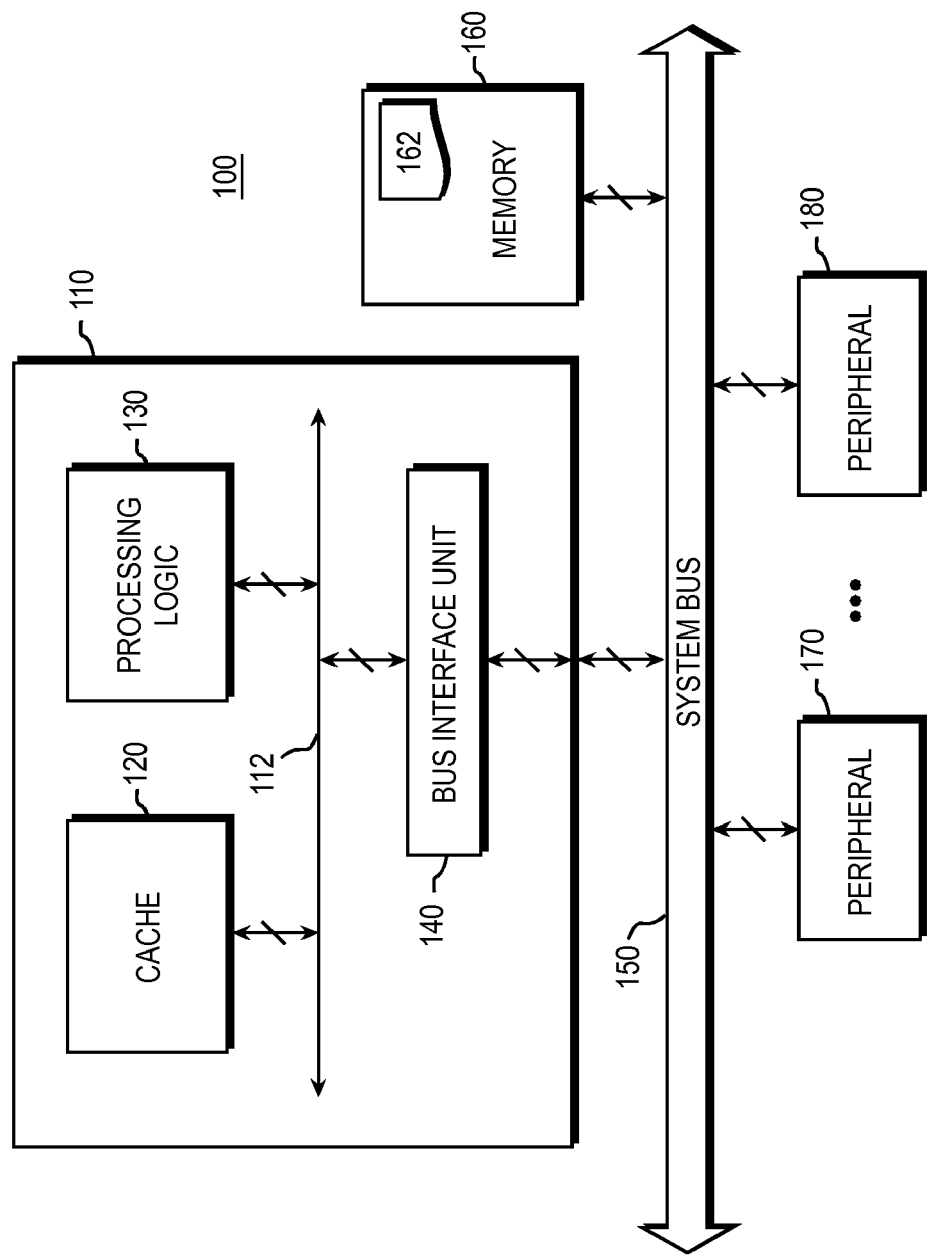
FIG. 1 illustrates one embodiment of a data processing system.

FIG. 1 illustrates one embodiment of a data processing system. Data processing system 100 includes a processor 110, a system bus 150, a memory 160 and one or more peripherals 170, 180.

The term "bus" is used to refer to a plurality of signals or conductors that may be used to transfer one or more various types of information, such as data, addresses, control, or status. Conductors may be illustrated or described in reference to a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

System bus 150 communicatively couples processor 110, peripherals 170, 180 and memory 160. The processor 110 includes a bus interface unit 140 for communicatively coupling with system bus 150. Bus interface unit 140 functions to coordinate the flow of information related to instruction execution by processing logic 130. Control information, instructions, and data resulting from the execution of instructions are exchanged between processing logic 130 and system bus 150 using bus interface unit 140.

The processor bus interface unit 140, cache 120, and processing logic 130 are communicatively coupled by an internal bus 112. Processing logic 130 implements data processing operations.

In one embodiment, data processing system 100 resides on a single integrated circuit. Alternatively, data processing system 100 can be implemented using more than one integrated circuit. In one embodiment, the data processing system resides on one or more integrated circuit die that may be packaged within one or more integrated circuit packages. In one packaging embodiment, the processor 110 resides on a single integrated circuit die within a single integrated circuit package.

In operation, the processor 110 executes instructions to perform various data processing functions. Cache 120 is a temporary information store for information used by processing logic 130. In one embodiment, cache 120 is a unified cache capable of storing more than one type of information for processing logic 130. One type of cacheable information includes processor-executable instructions. Another type of cacheable information includes data such as operand values.

Cache 120 serves as a storage buffer between memory 160 and processing logic 130. In various embodiments, cache 120 is mapped to memory 160 using one of a fully associative, direct mapping, or n-way set associative mapping. In one embodiment, cache 120 is thus an n-way set associative unified cache.

The term "application unit" refers to one or more coherent groups of processor-executable instructions for which a dedicated cache configuration is logically meaningful or can be practically implemented. An application unit can thus include an entire application or one or more logically divisible portions such as a program, subroutine, function, procedure, or module, for example. Generally, an application unit corresponds to a logically related group of processor-executable instructions. The application unit 162 or various portions of the application unit are stored in memory 160. The instructions forming the application unit are retrieved by processor 110 from memory 160. An application unit may originate from a peripheral device such as peripheral 170. Memory 160 thus may serve as a storage buffer between peripheral 170 and processor 110. Cache 120 may likewise serve as a storage buffer between memory 160 and processing logic 130 for individual instructions associated with the application unit. The data processing system may be operating in an environment where multiple application units or applications are executing concurrently. The performance or reliability constraints may vary among individual applications and even individual application units within a given application.

Figure 2:
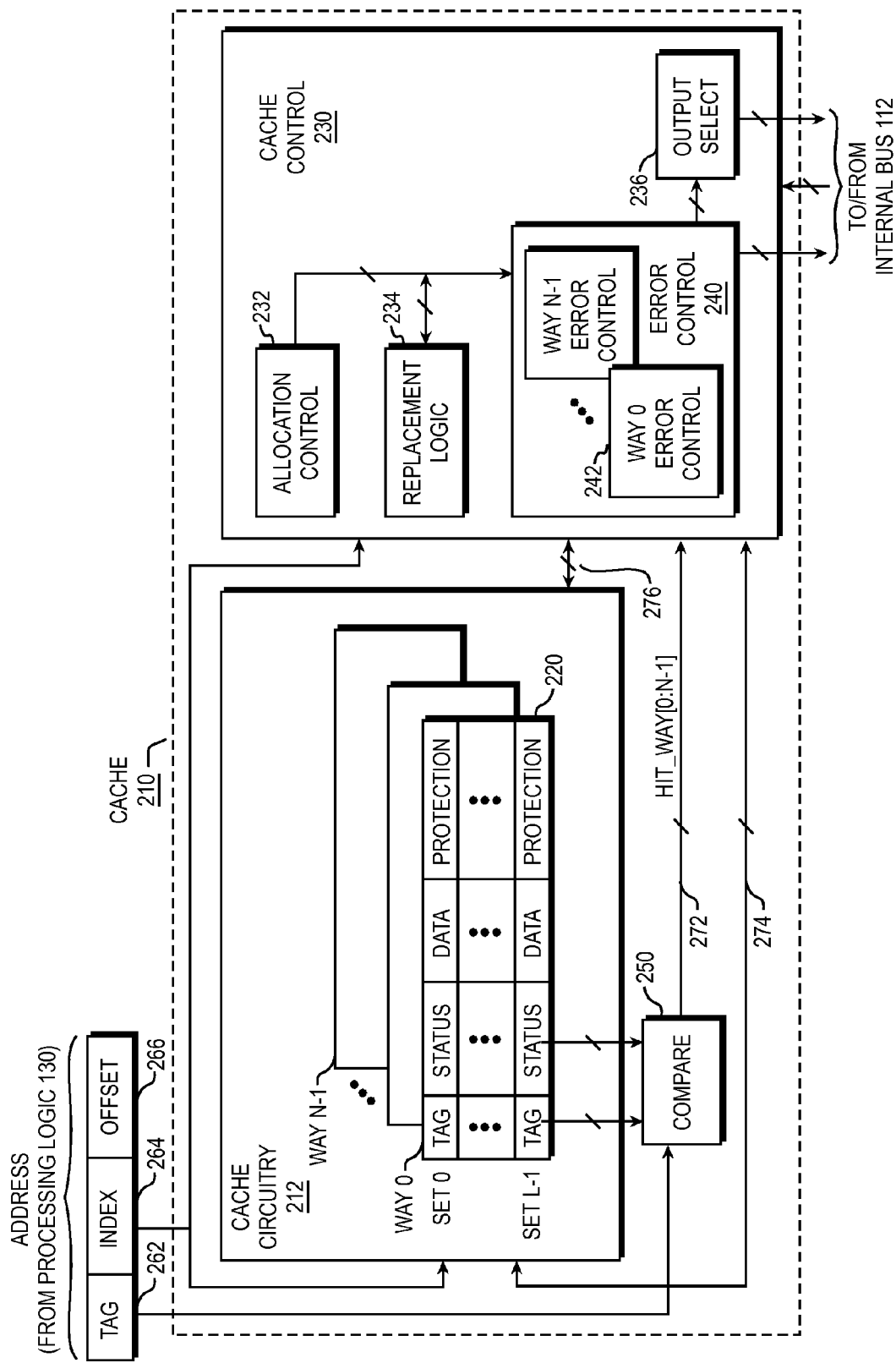
FIG. 2 illustrates one embodiment of a unified cache within the data processing system of FIG. 1.

FIG. 2 illustrates one embodiment of cache 120 of FIG. 1. Cache 120 is embodied as an n-way set associative unified cache 210. Processing logic 130 provides the cache with a cache address including a tag 262, index 264, and offset 266 field. The index field selects one of the L sets of the cache. The tag field is compared to the corresponding tag field of the selected set using compare 250. Any match is necessarily further qualified by the status field of the selected set to ensure that the contents of the corresponding data field are valid. If a valid match is found, then a cache hit is established. Signal lines 272 (HIT_WAY[0:N-1]) indicate which way has encountered a cache hit. If there is no valid match then there is no cache hit for any way.

The cache is accessed for both read and write accesses. If there is a cache hit for a read access, then the data and protection fields of the corresponding cache line are provided to cache control 230 by signal lines 276. Error control 240 may perform error detection and correction on the received cache data. The specific error control is determined by the way error control 242 of the way that was the source of the received data. Signal lines 272 identify which way error control 242 the output select 236 chooses from error control 240. The resulting cache data is provided to system bus 150 by output select 236. Depending upon the type of way error control, the error control circuitry may simply detect an error, correct the data, or leave the received cache data unaltered. An error indicator may also be provided by the error control 240 to the internal bus 112.

If there is a cache hit for a write access, then information from internal bus 112 is provided by cache control 230 to cache 210 using signal lines 276. The cache control may also update the associated status field for the cache line experiencing the cache hit. The protection field may likewise be updated by protection information generated from the received cache data by the error control 240.

Replacement logic 234 identifies a cache line for replacement using allocation control 232 if there is a cache miss. The replacement logic may rely on any method of scheduling cache line replacement including least recently used (LRU), round robin, and pseudo-LRU. The cache control 230 provides new cache data for storage into the data field of the selected cache line using signal lines 276. Cache control may also provide information for the status and protection fields of the selected cache line. The protection information is generated by error control 240 from the cache data received from internal bus 112. The cache data received from the internal bus may be modified by error control 240 prior to storage in the cache line in the event an error is detected and corrected.

The unified cache is configurable such that each of the n ways may be specifically allocated to various combinations of data and instruction-type information. In one embodiment, the specific configuration of the ways is controlled by allocation control 232 as controlled by processing logic 130.

Figure 3:
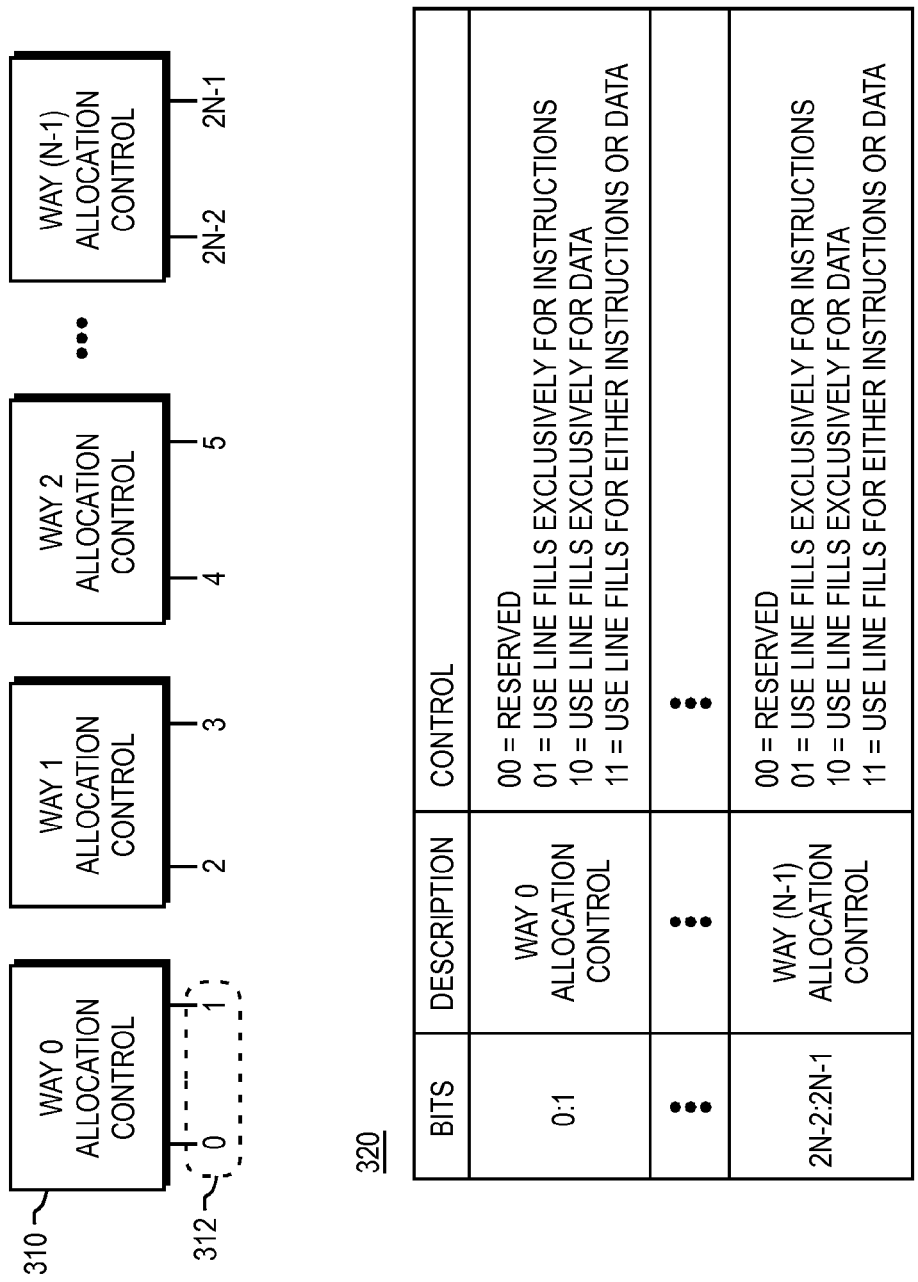
FIG. 3 illustrates one embodiment of a way allocation control for the unified cache of FIG. 2.

FIG. 3 illustrates one embodiment of a way allocation control for the cache of FIG. 2. Each way may be allocated exclusively for data line fills, exclusively for instruction line fills, or permit both data and instruction line fills. In some embodiments, a particular way may also be designated for non-allocation (i.e., excluding both data and instruction-type information). Allocation control 232 utilizes two bits 312 to control each of the n individual ways 310. Table 320 illustrates one embodiment of assignment of control bits, control bit values, and the effect of such control bit values for each way 310.

For example, bits 0:1 control the allocation of WAY 0 310. The value assigned to these bit positions determines the type of information permitted to be stored in the data field of any set within WAY 0. In the illustrated embodiment, the value "01" for bits 0:1 allocates WAY 0 exclusively for instruction line fills. Thus the data field of any set within WAY 0 is permitted to store only instruction type information with this allocation control setting.

The value "10" for bits 0:1 allocates WAY 0 exclusively for data line files. Thus the data field of any set within WAY 0 is permitted to store only data-type information with this allocation control setting.

The value "11" for bits 0:1 allocates WAY 0 to permit both data and instruction line fills within WAY 0. Thus some data fields may be storing instruction-type information while other data fields are storing data-type information at any given point in time. There is no constraint as to whether a particular set is storing instruction-type or data-type information with this allocation control setting.

In the illustrated embodiment, the value "00" is not assigned a specific allocation control. In alternative embodiments, there may be a different number of fields or a different number of control bits as needed to define how the fields may be allocated within a particular way of cache 210.

The ability to configure the cache ways specifically to data-only, instruction-only, or both data and instruction allows for performance tuning of an application executed on the processor. The reliability of the cache, however, is also affected by the configuration.

The cache has an inherent failure in time (FIT) rating reflecting a spontaneous source of errors that may degrade reliability of the cache. These errors can be ameliorated through the use of various error management techniques. Less sophisticated error management techniques tend to result in a greater number of material, undetected failures in time that in turn tend to decrease the reliability of the cache. However, such errors may be more problematic for some types of cached information rather than other types of cached information. Accordingly, different levels of error management can be applied to different types of information in an effort to achieve an acceptable tradeoff between performance and reliability for a specific application.

Error control 240 may provide different error management methods for different areas of the cache. For example, the error control may provide error detection code (EDC) to aid in detecting errors. There are EDC techniques of various complexity. Parity coding is a low complexity error management technique. The error control may also provide error correction code (ECC) to facilitate both detecting and correcting an error by restoring the information to its proper value. ECC error management techniques tend to add greater complexity to cache management. Generally, the level of sophistication of error management results in tradeoffs between performance and reliability of the functioning of the processor.

In one embodiment, the type of error management utilized for different areas of the cache depends upon the type of information stored in the cache. In particular, the error management approach for each way of an n-way set associative unified cache is determined by the allocation of that way to support a particular information type. In various embodiments, such allocations include exclusively instruction type information, exclusively data-type information, or both data and instruction type information. Thus ways allocated for exclusive storage of instruction-type information may utilize a first type of error management such as ECC while ways allocated for exclusive storage of data-type information may rely upon a second type of error management such as EDC. The ability to allocate the ways to different types of information changes the mix of error management methods and ultimately the reliability of the cache. In some cases, the performance of the cache will not change for different combinations of way allocations even though the reliability may be significantly impacted. To ensure performance with at least a desired level of reliability, the way allocation may be selected based at least in part on reliability.

In one embodiment, way error control is configured to provide ECC protection for exclusively instruction-type cache information while providing EDC protection such as parity-only protection for exclusively data-type information. The parity-only protection will result in a higher number of material, undetected FIT errors as compared to the use of ECC protection. In one embodiment, the possible utilization of a way for data dictates the use of data-type error management such that the way error control provides EDC protection (e.g., parity-only protection) for any way that is allocated to permit either data-type information or instruction-type information.

FIG. 4 illustrates a table of cache way configuration permutations and associated failure in time (FIT) error rates for an n-way unified cache (n=4). Generally, ECC protection can result in virtual elimination of FIT errors as compared with EDC protection such as parity-only protection. The overall rate of undetected errors is thus generally controlled by the mix of parity-only protection to ECC protection among the ways.

If all n/n ways are allocated for instruction-only type information ("I"), then all n ways will utilize ECC protection such that the resulting error rate is virtually nil. If all n ways are allocated for data type information ("D"), then the material, undetected FIT error rate is $\epsilon_1$. Accordingly, each way allocated for data type information contributes $\epsilon_1/n$ to the error rate. Thus given the way allocation control 412 wherein WAY 0 is allocated for instruction-only type information while WAY 1, WAY 2, and WAY 3 are allocated for data-only information, the error rate 414 is 0.75 $\epsilon_1$. This error rate is due to the mix of error management techniques. The cache error rate is thus dependent upon the way allocation control.

In one embodiment, if all n ways are allocated for data or instruction type information ("D/I") then the material undetected FIT error rate is $\epsilon_2$. Accordingly each way allocated as D/I contributes $\epsilon_2/n$ to the error rate. The error rate varies depending upon the mix of error management techniques. The reliability of the cache is thus dependent upon the way allocation control. Performance measures such as execution throughput for a given application or application unit may likewise vary depending upon the characteristics of the application unit and the way allocation control. Accordingly, the way allocation control can potentially be configured to meet constraints imposed either by performance requirements, reliability requirements, or both.

The error rate does not represent functional "errors" such as cache misses or detectable and recoverable errors that are detected and can be planned for as a result of the EDC/ECC or other error management. Any performance issues resulting from functional errors or errors which have been anticipated and planned for by design tends to be reflected in the performance rating. Although the error rate and performance rating may both be affected by the combination of way allocation assignments, the error rate represents errors that are not inherently encompassed by the performance rating. The error rate represents the incidence rate of undetected, material errors. Reliability decreases with increasing error rate and the reliability increases with decreasing error rate.

Figure 5:
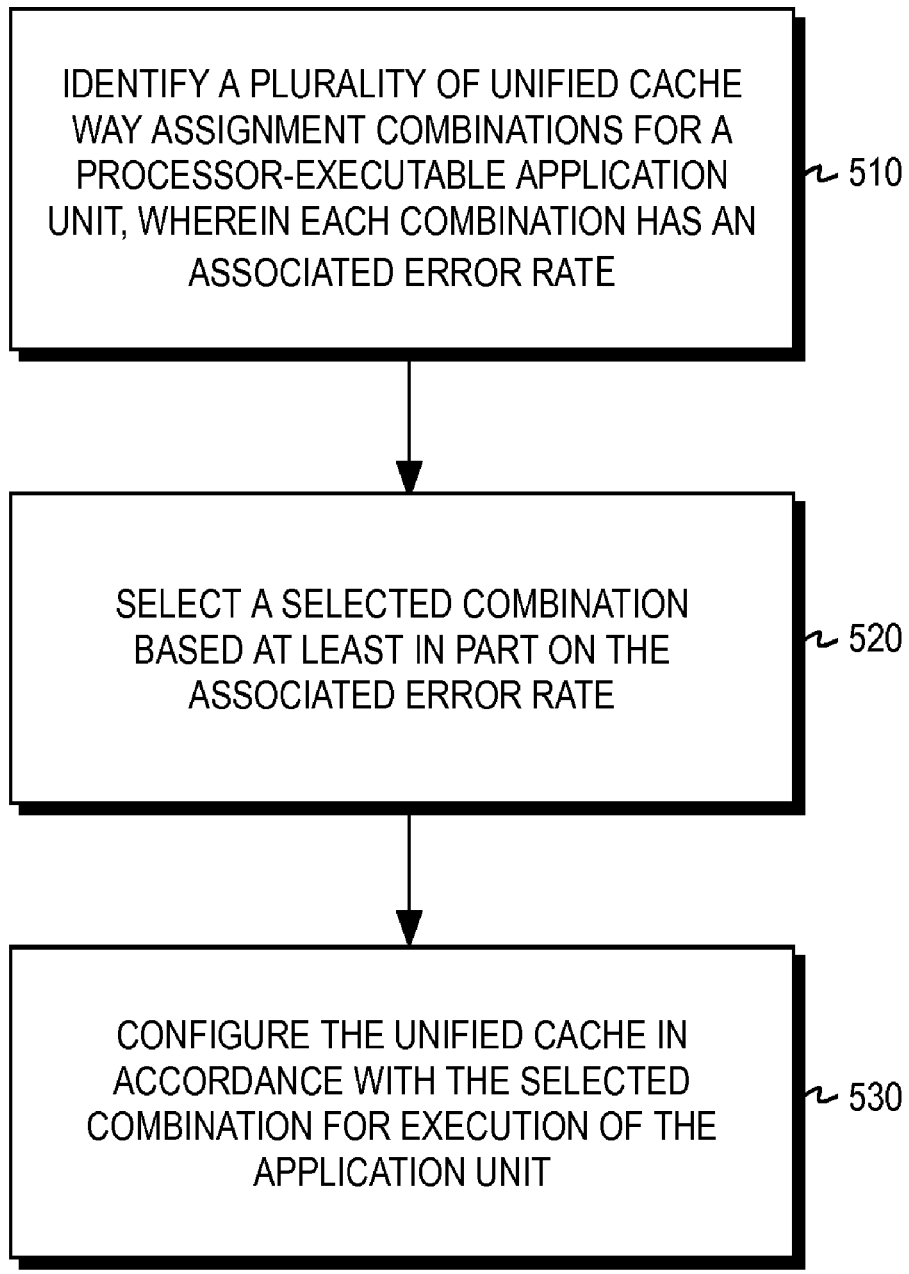
FIG. 5 illustrates one embodiment of a method of selecting a unified cache way assignment combination based at least in part on associated error rate for execution of an application unit.

FIG. 5 illustrates one embodiment of a method of selecting a combination of cache way assignments based at least in part on the error rate. In step 510, a plurality of cache way assignments for a processor-executable application unit is identified. Each combination has an associated error rate. In step 520, one of the combinations of the plurality of combinations is selected as a selected combination based at least in part on the associated error rate. In step 530, the unified cache is configured in accordance with the selected combination for execution of the application unit.

With respect to step 520, the combination with the minimum error rate (assuming the minimum error rate is below a maximum pre-determined error threshold of $\epsilon_T$) may be selected if reliability is the paramount concern. If there is not a unique combination associated with the minimum error rate (i.e., two or more combinations have the same minimum associated error rate among the plurality of combinations), then any combination having an error rate that is no greater than the error rate associated with any other combination is selected as the selected combination. If the reliability constraint is relaxed to permit any combination having an error rate less than the pre-determined threshold, then the choice of selected combination may be guided by other constraints.

With respect to step 520, for example, the list of prospective combinations may be limited by constraining eligible combinations to those having an error rate that does not exceed a pre-determined error threshold, $\epsilon_T$. In essence, possible combinations (and all equivalent permutations) can be eliminated due to insufficient reliability as determined by the error rate. Any combination having an associated error rate that exceeds a pre-determined threshold, $\epsilon_T$ is implicitly or explicitly eliminated as a candidate for the selected combination. In the event that more than one combination satisfies the reliability constraint, the user is free to select from among the remaining combinations based upon other factors such as performance rating.

Figure 6:
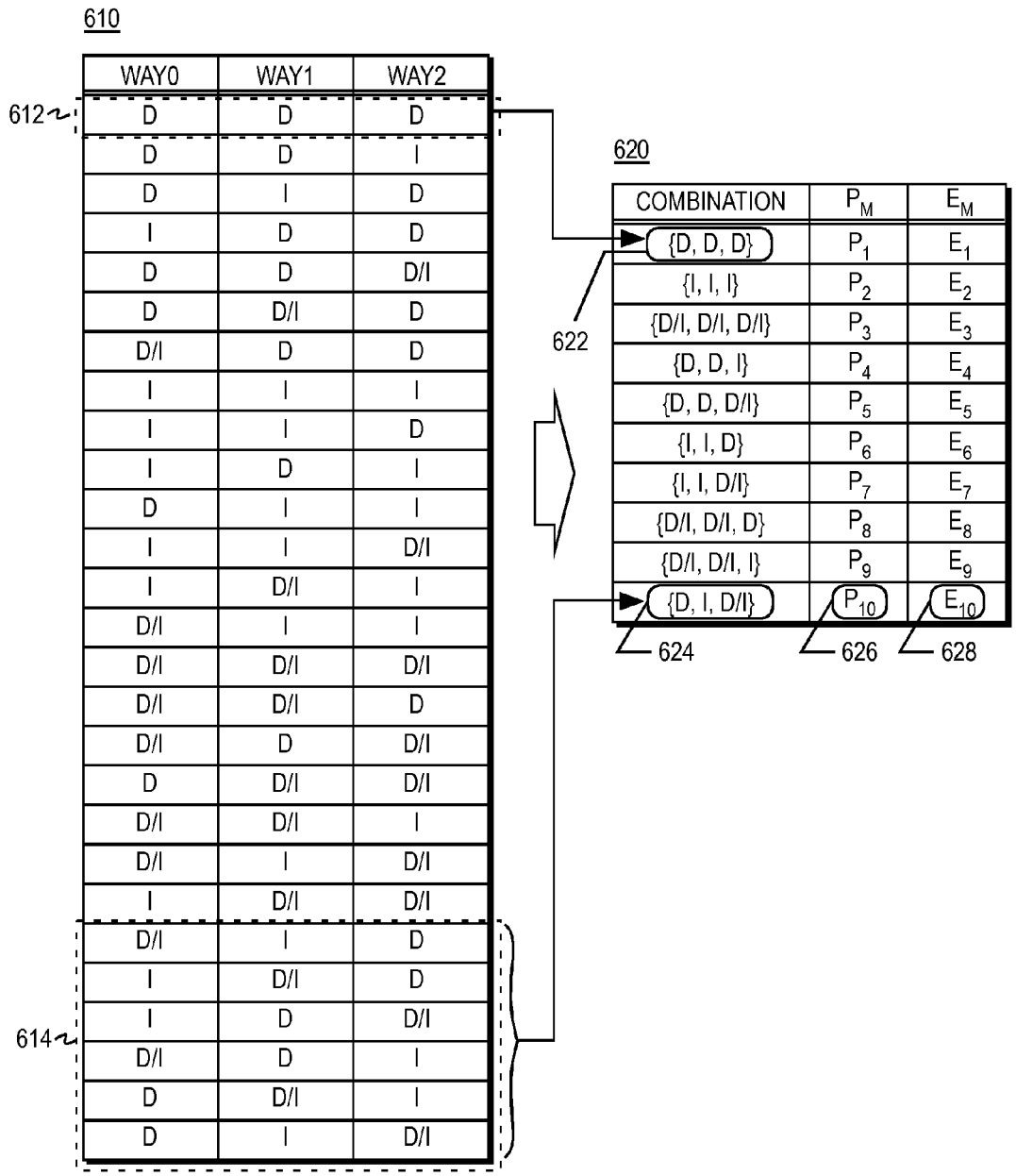
FIG. 6 illustrates one embodiment of a derivation of cache way assignment combinations from cache way assignment permutations.

FIG. 6 illustrates a table 610 of permutations of way assignments for a unified cache having 3 ways (n=3). In the illustrated embodiment, each way is presumed to have 3 possible configurations: data only, instruction only, or either data or instruction. The number of permutations of way assignments is thus $3^n=27$. Generally, the performance ratings and error rates for several of permutations will be the same because the relative number of ways allocated to data only, instruction only, or data and instruction representing the mix or combination of way assignments is dispositive of one or more permutations. Accordingly, the decision making process can be simplified by choosing among unique combinations rather than from the list of all possible permutations of way assignments.

Table 620 illustrates the unique combinations of way assignments. The 27 permutations have been reduced to 10 combinations for the purposes of making a selection. This reduction may be achieved by utilizing a specific permutation to represent all permutations subsumed within a given combination, if necessary. Each unique combination represents one or more permutations of way assignments. For example, combination 622 of table 620 corresponds to only a single permutation 612 of table 610. In contrast, combination 624 of table 620 represents several permutations 614 from table 610.

Each combination 624 represented in table 610 has a performance rating 626. The performance rating may be measured or estimated. For example, in one embodiment the application unit is executed and the performance rating is measured. Various metrics may be used for performance rating. One metric for performance rating is throughput. "Throughput" may refer to speed with which the application unit is executed from beginning to conclusion, the rate at which instructions are executed, the rate at which data is handled (input or output or both), or generally any similar measure. The performance rating may be based on other metrics or combinations of metrics. The performance rating may be based, for example, on one or more of throughput, power consumption, memory utilization, contribution to thermal load, etc. attributable to the execution of the application unit. The performance rating may be associated with any component of the data processing system, the data processing system as a whole, or any device utilizing or utilized by the data processing system.

Similarly, each combination 624 represented in table 610 has an error rate 628. The error rate may likewise be measured or estimated. The error rate in one embodiment is the number of material undetected errors of the cache.

Although a single performance rating and error rate is indicated for each combination, the performance of the application unit with a particularly configured cache combination may vary based upon process, voltage, or temperature (PVT) or frequency. Similarly, the error rate may vary based upon process, voltage, or temperature (PVT) or frequency. Accordingly, each identified combination may have different error rates and performance ratings depending upon PVT, frequency, and other considerations. The associated performance rating and associated error rate may be qualified by frequency or PVT as necessary. Thus each combination may be associated with a vector of performance ratings and error rates distinguished and indexed by dynamic environmental characteristics such as PVT or frequency. Accordingly, these additional characteristics may be relevant to which performance rating or error rate is associated with a given combination at the time of selection from the plurality of combinations. Although environmental characteristics may add additional dimensions of error rates and performance ratings for a given combination, generally a specific dimension will be dictated by the environmental characteristics present at the time the selection is being made such that the choices are based upon evaluation of scalar values.

Figure 7:
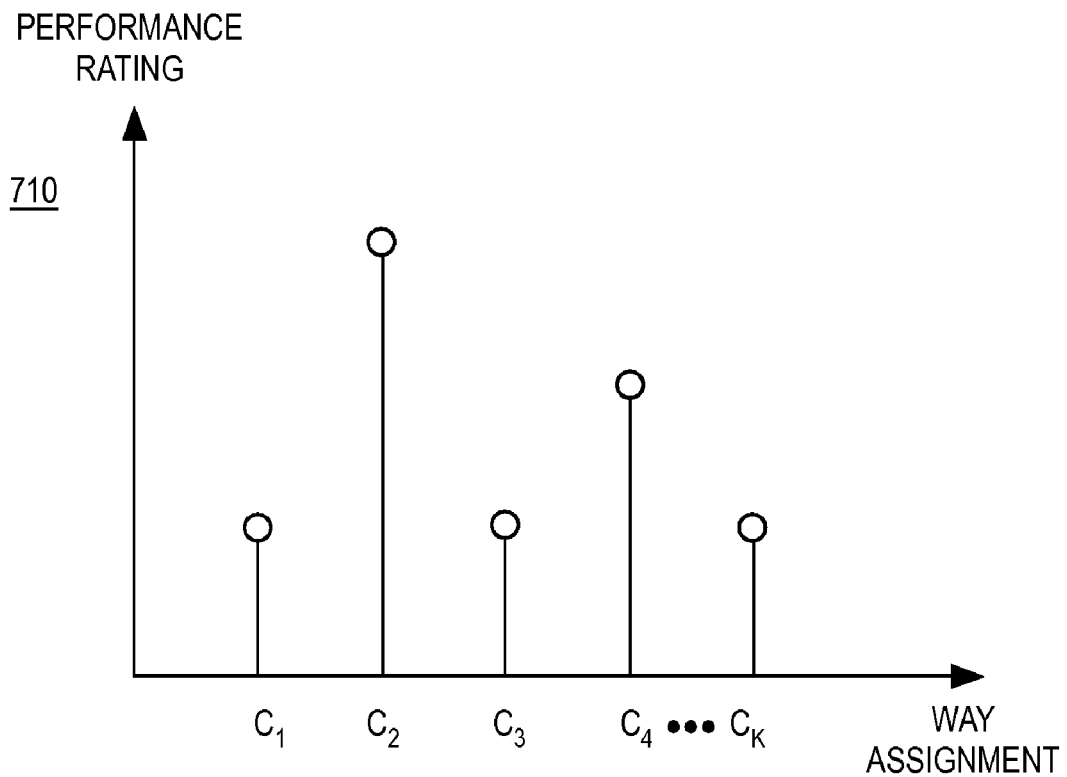
FIG. 7 illustrates one embodiment of a graph of the performance of an application unit with different combinations $\{C_1, C_2, \ldots C_K\}$ of unified cache way assignments.

FIG. 7 illustrates one embodiment of a graph 710 of the performance of an application unit with different combinations $\{C_1, C_2, \ldots C_K\}$ of unified cache way assignments. The performance ratings may be measured or estimated. In one embodiment, the application unit is iteratively executed to identify performance ratings based on one or more selected performance metrics for a variety of frequency and PVT environments. The graph and performance rating reflect whatever the desired performance rating represents. The graph may represent processing throughput, thermal load performance, memory utilization, or any desired performance metric.

Figure 8:
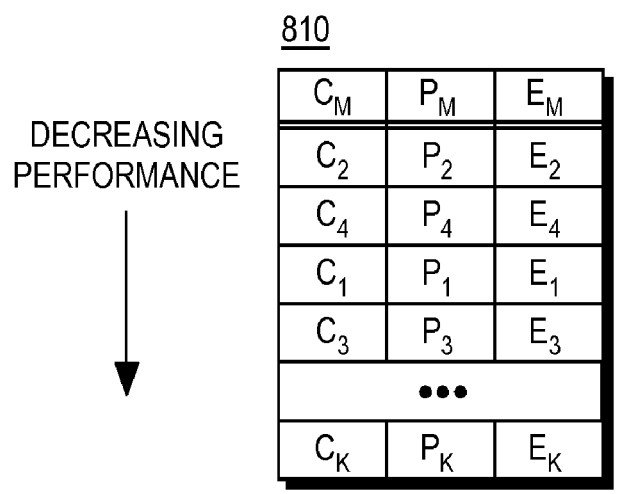
FIG. 8 illustrates a table of combinations of cache way assignments sorted in accordance with the associated performance ratings illustrated in FIG. 7 for a given application unit.

FIG. 8 illustrates a table 810 of combinations of cache way assignments with associated performance and error rates sorted by the performance ratings as illustrated in FIG. 7 for a given application unit. Sorting may facilitate the decision making process. Although $C_2$ represents the combination with the greatest performance rating, both the performance rating and error rates are relevant to the decision-making process. In one embodiment, the combination with the greatest performance rating having an error rate that does not exceed a pre-determined threshold ($\epsilon_T$) is selected. If, for example, $\{E_3, E_4\} \leq \epsilon_T$ and $\{E_1, E_2, E_K\} > \epsilon_T$, then $C_4$ is selected as the combination with the greatest performance rating having an error rate that does not exceed $\epsilon_T$.

Figure 9:
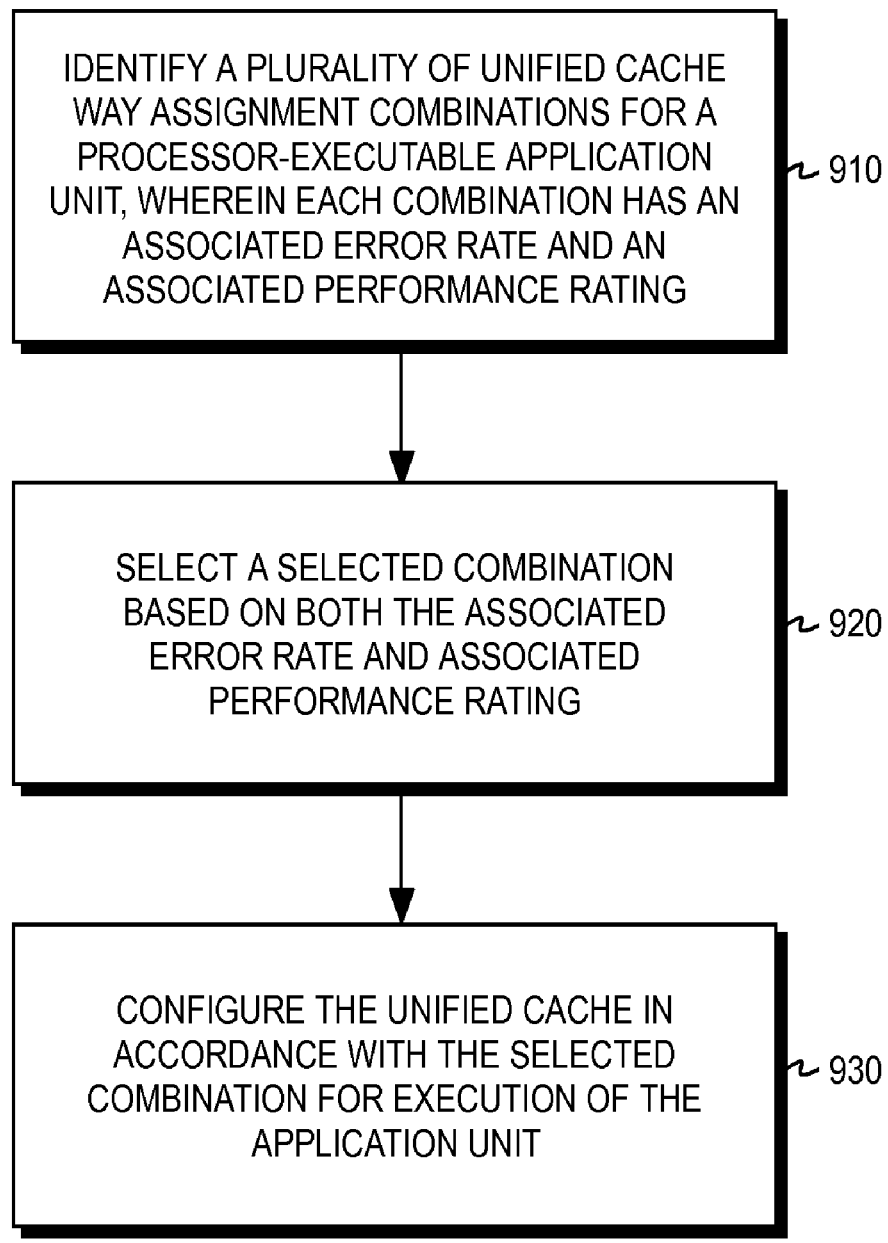
FIG. 9 illustrates one embodiment of a method of selecting a unified cache way assignment combination of in accordance with both a performance rating and an error rate for execution of an application unit.

FIG. 9 illustrates one embodiment of a method of selecting a combination of cache way assignments in accordance with both a performance rating and an error rate. In step 910, a plurality of cache way assignments for a processor-executable application unit is identified. Each combination has an associated error rate and an associated performance rating. The error rate represents the reliability of a particular configuration that is a measure of the risk of undetected, material errors that may occur. In step 920, one of the combinations of the plurality of combinations is selected as a selected combination based on both the associated error rate and associated performance rating. In step 930, the unified cache is configured in accordance with the selected combination for execution of the application unit.

With respect to step 920, the metric for selection may constrain the choices to the combination with the maximum performance rating from the combinations that result in sufficient reliability as described with respect to FIGS. 7-8. Sufficient reliability may be defined as having an error rate that does not exceed a pre-determined threshold, $\epsilon_T$.

The subset of eligible combinations (i.e., those meeting the reliability constraint) might not include a unique combination with a unique maximum performance rating. In such a case, a combination is selected from the subset of combinations having an associated error rate that does not exceed a pre-determined threshold, $\epsilon_T$, wherein the selected combination is any combination of the subset that has an associated performance rating no less than the performance rating of any other combination of the subset of combinations. In other words, a subset of the plurality of combinations can be formed by eliminating any combination having an associated error rate that equals or exceeds the pre-determined threshold. Any selection from the remaining subset is thus assured of meeting the reliability constraint (i.e., error rate does not exceed $\epsilon_T$) irrespective of its performance rating.

With respect to step 930, the selected combination includes any permutation of way assignments that may be subsumed into the selected combination. The user may further constrain the selection process to provide that only a particular permutation corresponding to a selected combination can be chosen because the performance and reliability tend to have no variation for any permutation within a given combination of way assignments.

Figure 10:
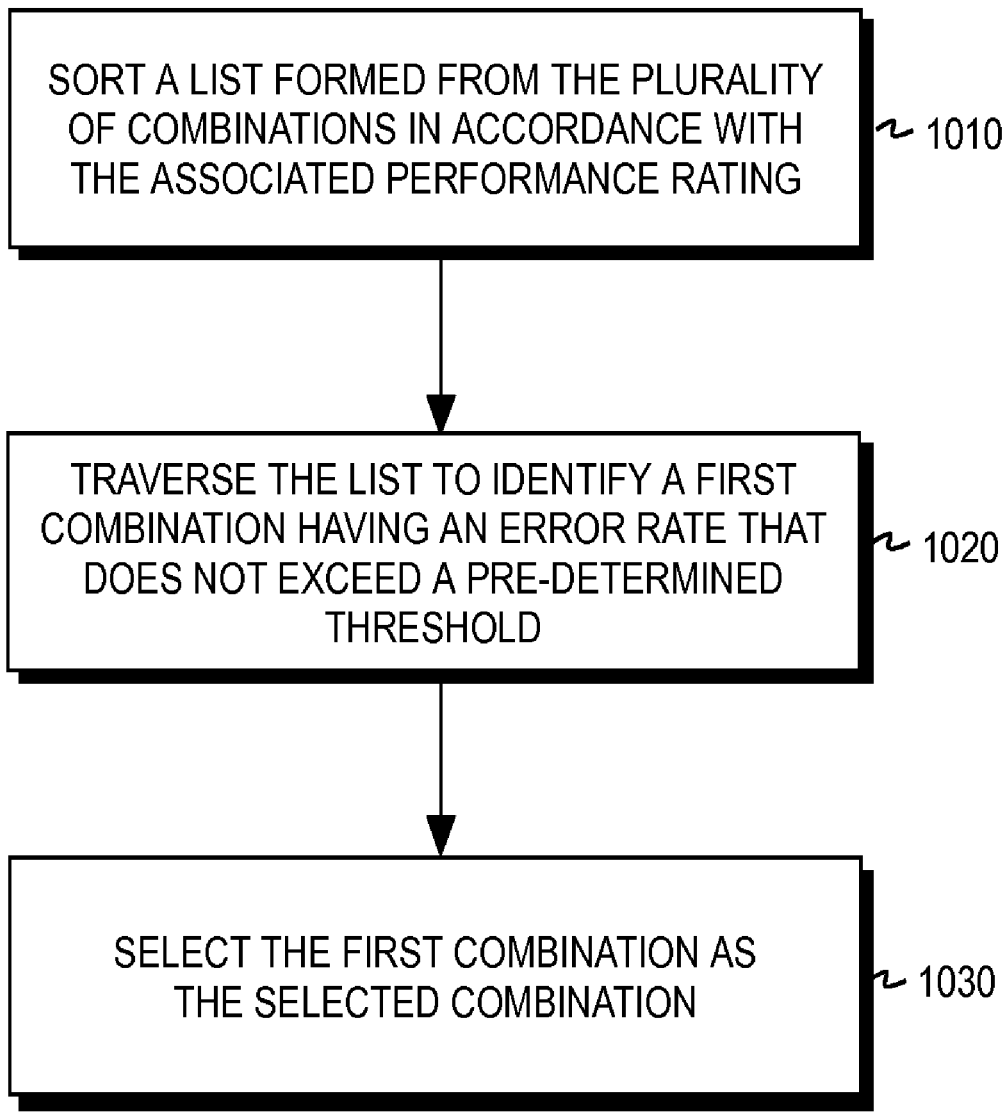
FIG. 10 illustrates one embodiment of a method of selecting a particular combination of cache way assignment combination.

FIG. 10 illustrates one embodiment of selecting a particular combination as set forth in step 920 of FIG. 9. In step 1010, a list formed from the plurality of combinations is sorted in accordance with the associated performance ratings. In one embodiment, the list consists only of a subset of the plurality of combinations that have an associated error rate that does not exceed the pre-determined threshold. In another embodiment, the list comprises the plurality of combinations sorted by performance rating. Although more than one combination may have the same performance rating such that the list cannot be a strictly ascending or descending list, the list can be sorted monotonically such that successive performance ratings are either non-increasing or non-increasing in value.

In step 1020, the list is traversed to find the first combination having an error rate that does not exceed the pre-determined threshold. In the event that the list was formed such that it consists only of the subset of combinations meeting the reliability constraint, this may be the first element of the list if the list is sorted by descending performance rating or the last element of the list if the list is sorted by ascending performance rating. Otherwise, starting from the best performance rating, each element of the list is successively tested to determine whether the associated error rate meets the reliability constraint. The first element that meets the reliability constraint becomes the selected combination in step 1030.

Although the methods set forth above have been described with respect to a unified cache architecture, the innovation illustrated in these embodiments is applicable to other architectures including split-cache or Harvard cache architectures and may likewise be utilized with different error management techniques. Generally, the innovation may be applied to configurable caches utilizing different error management methods for different areas of the cache regardless of the specific cache architecture.

Figure 13:
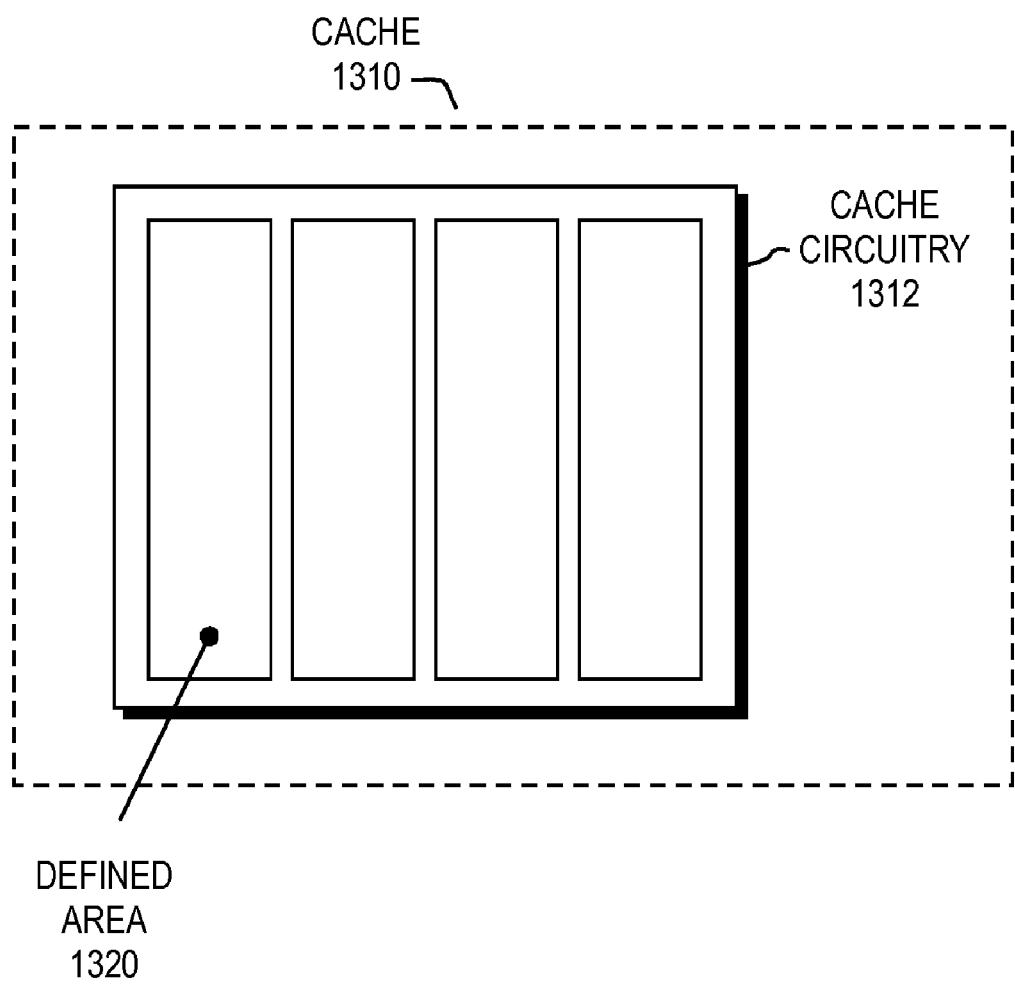
FIG. 13 illustrates one embodiment of a cache.

FIG. 13 illustrates one embodiment of a cache 1310. The cache includes cache circuitry 1312 for storage of information. Cache 1310, cache circuitry 1312, and a plurality of defined areas 1320 may be distributed across one or more integrated circuit die. The defined area 1320 is generally a portion, block, or region of cache circuitry that has a common attribute such as designated for storage of a particular type of information or subject to a particular error management technique or error rate. The plurality of defined areas may comprise defined areas of different sizes. Alternatively, the defined areas may have the same size (i.e., storage capacity). Although the particular type of information may include exclusively data, exclusively instruction, or both data and instruction, the type of information may be further categorized and distinguished by type of access.

For example, the defined area 1320 may be "locked" such that the current contents (e.g., instructions or data) cannot be replaced by cache replacement logic. Alternatively the defined area may be unlocked to enable replacement. The defined area may be allocated to permit read only accesses from processing logic such as processing logic 130 of FIG. 1. Alternatively, the defined area may be allocated to permit read and write access from processing logic.

Cache 1310 may be implemented as a bifurcated or split (i.e., "Harvard") cache with separate busses for instruction and data. Cache 1310 may alternatively be implemented as a unified cache or other cache architecture. The cache may be mapped as a set associative cache, pseudo-associative cache, direct-mapped cache, fully-associative cache or other mapping. In one embodiment, for example, cache 1310 is a unified, set-associative cache wherein the defined areas correspond to ways. Irrespective of the particular architecture, the ability to configure the cache 1310 to vary the mix of information types enables tuning for performance while the existence of different error rates qualifies the performance by reliability.

Characteristics of the information to be stored or the application unit may dictate the error management method, replacement logic access, processing logic access, or other control for handling the content of the defined area. Examples of characteristics that may affect handling of the information include the user, hierarchical protection domain, cache transience, or use of the information. Hierarchical protection domains are levels of privilege associated with different modes of operation such as kernel (i.e., supervisor) or user modes. Passwords or security keys such as encryption/decryption keys are examples of use that may dictate particular handling requirements. Cache transience refers to the length of time or persistence of the information within the cache.

Figure 11:
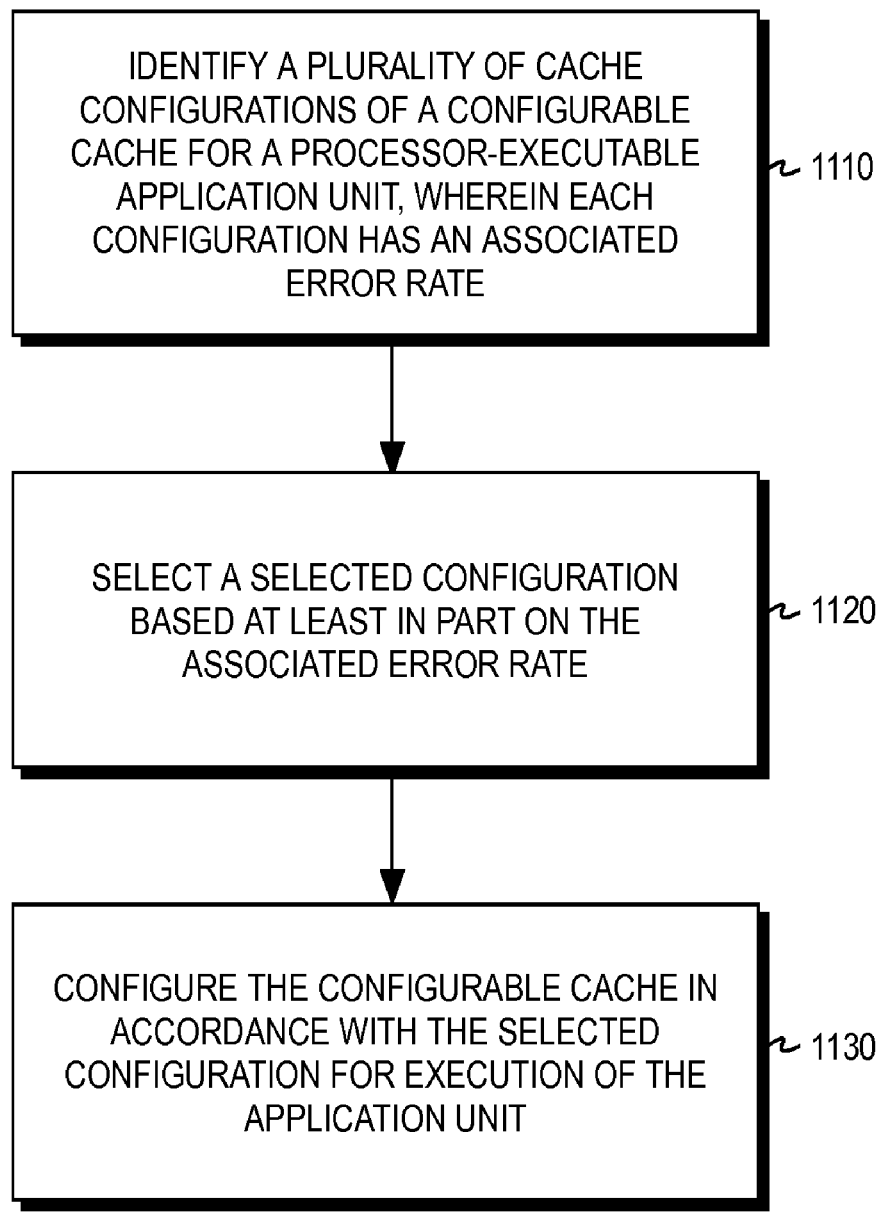
FIG. 11 illustrates one embodiment of a method of selecting a cache configuration based at least in part on an error rate.

FIG. 11 illustrates one embodiment of a method of selecting a cache configuration based at least in part on an error rate. In step 1110, a plurality of cache configurations of a configurable cache is identified for a processor-executable application unit. Each configuration has an associated error rate. In step 1120, one of the configurations of the plurality of configurations is selected as a selected configuration based at least in part on the associated error rate. In step 1130, the configurable cache is configured in accordance with the selected combination for execution of the application unit.

Thus, for example, the configurable cache may be any type of cache having selectable configurations differentiated by varying levels of performance and reliability. The caches are configurable for storing specified types of information in defined areas of the cache.

In the case of a unified cache, different areas may be configured for data only, instruction only, or both data and instruction. These areas correspond to "ways" for a unified cache. For a split or bifurcated cache, the type of information that may be stored in a defined area is more limited (i.e., instruction only or data only). The allocation of areas between instruction and data affects performance for a given application unit.

The differences in reliability among configurations corresponds to the use of different error management techniques for different areas of the cache irrespective of the type of information that may be stored in those areas and irrespective of the cache architecture. The error management may be specific to the type of information stored or to specific areas of the cache. The error management may incorporate a multi-bit ECC for one or more areas of the cache to aid in detection and correction of errors. The error management may utilize EDC for one or more other areas of the cache. Although EDC may be single bit or multi-bit code, EDC is only capable of detecting the presence of an error. Single bit EDC codes generated from attributes such as whether there are an odd number or an even number of bits having a particular value (i.e., a parity EDC) are more susceptible to undetected errors than ECC. Regardless of the classification of error detection or error correction, the result is that the overall reliability of the cache is affected by the mix of error management techniques for the cache.

Differences in error management for different areas of the cache as well as the allocation of the areas to specific types of information thus contributes to the variation in reliability and performance of the cache irrespective of specific cache architecture. Although users may be concerned about both performance and reliability, some users may prefer an optimal performance qualified by a certain level of reliability. Other users may prefer an optimal reliability qualified by a certain level of performance.

Figure 12:
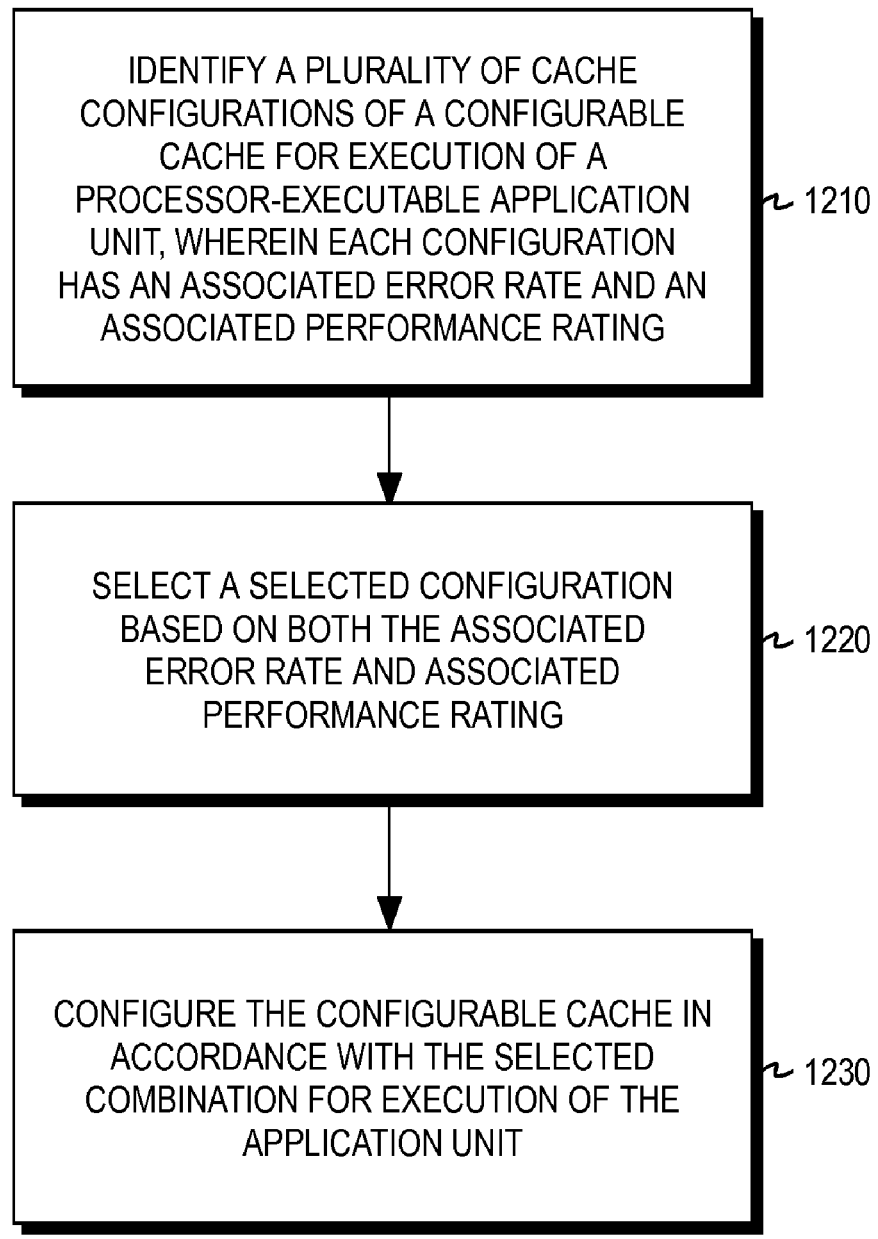
FIG. 12 illustrates one embodiment of a method for selecting a cache configuration in accordance with both performance and reliability constraints.

FIG. 12 illustrates one embodiment of a method for selecting a cache configuration in accordance with both performance and reliability constraints. In step 1210, a plurality of cache configurations of a configurable cache is identified for a processor-executable application unit. Each configuration has an associated performance rating and an associated error rate. In one embodiment, the associated error rate represents the reliability of a particular configuration that is a measure of the risk of undetected, material errors that may occur for that configuration.

In step 1220, a selected configuration is selected based on both the associated error rate and the associated performance rating. In step 1230, the configurable cache is configured in accordance with the selected configuration for execution of the application unit.

In one embodiment, the selection may be guided by an attempt to choose an optimal performance with the constraint that the error rate does not exceed a pre-determined threshold, $\epsilon_T$. In an alternative embodiment, the selection may be guided by an attempt to choose an optimal reliability with the constraint that the performance rating does not fall below a pre-determined threshold, $P_T$.

Unless stated otherwise, terms such as "first" and "second" are used to arbitrarily distinguish between the elements such terms describe. Thus, these terms are not necessarily intended to indicate temporal or other prioritization of such elements.

Thus methods and apparatus for enabling a cache to meet one or more of a reliability constraint and a performance constraint for execution of an application unit have been described. Although the invention is described herein with reference to specific embodiments, various modifications and changes can be made without departing from the scope of the present invention as set forth in the claims below. For example, the cache architecture, error management technique, and number of processors of the data processing system may be varied. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A method of configuring a cache, comprising:
   (a) identifying a plurality of cache configurations of a configurable cache for a processor-executable application unit, wherein each configuration has an associated error rate;
   (b) selecting a selected configuration based at least in part on the associated error rate, wherein the associated error rate is exclusive of cache misses; and
   (c) configuring the configurable cache in accordance with the selected configuration for execution of the application unit, wherein the cache is configurable for storing specified types of information in defined areas of the cache, and wherein an error management for a given area is determined by the type of information specified for the given area.

2. The method of claim 1 wherein the cache is one of a unified cache and a split cache.

3. The method of claim 2 wherein the configurations correspond to combinations of way assignments for the unified cache.

4. The method of claim 1 wherein the associated error rate of the selected configuration does not exceed the associated error rate of any other configuration.

5. The method of claim 1 wherein (b) comprises selecting any selected configuration having an associated error rate that does not exceed a pre-determined threshold, $\epsilon_T$.

6. The method of claim 1 wherein the specified types of information for a given area include at least one of: exclusively data, exclusively instruction, and both data and instruction.

7. The method of claim 1 wherein error correction code error management is utilized for at least one defined area configured exclusively for instructions.

8. The method of claim 1 wherein parity error detection code error management is utilized for at least one defined area configured exclusively for data.

9. A method of configuring a cache, comprising:
   (a) identifying a plurality of cache configurations of a configurable cache for a processor-executable application unit, wherein each configuration has an associated error rate and an associated performance rating;
   (b) selecting a selected configuration based on both the associated error rate and the associated performance rating, wherein the associated error rate is exclusive of cache misses; and
   (c) configuring the configurable cache in accordance with the selected configuration for execution of the application unit, wherein the cache is configurable for utilizing a specified error management for defined areas of the cache, and the cache is configurable for storing specified types of information in defined areas, and wherein the error management for a given area depends upon the specified type of information that the given area is configured for.

10. The method of claim 9 wherein the associated error rate of the selected configuration does not exceed the associated error rate of any other configuration.

11. The method of claim 9 wherein (b) comprises selecting any selected configuration having an associated error rate that does not exceed a pre-determined threshold, $\epsilon_T$.

12. The method of claim 9 wherein the associated performance rating of the selected configuration is not less than the associated performance rating of any configuration having an error rate that does not exceed a pre-determined threshold, $\epsilon_T$.

13. The method of claim 9 wherein (b) comprises selecting any selected configuration having a performance rating that is not less than a pre-determined threshold, $P_T$.

14. The method of claim 9 wherein the associated error rate of the selected configuration is not greater than the associated error rate of any configuration having a performance rating that is not less than a pre-determined threshold, $P_T$.

15. The method of claim 9 wherein the cache is configurable for storing specified types of information in defined areas, wherein the specified types of information for a given area include at least one of: exclusively data, exclusively instruction, and both data and instruction.

16. The method of claim 9 wherein error correction code error management is used for at least one defined area configured exclusively for instruction-type information.

17. The method of claim 9 wherein parity error detection code error management is utilized for at least one defined area configured exclusively for data-type information.

* * * * *